(12) United States Patent
Chauvin

(10) Patent No.: US 10,456,951 B2
(45) Date of Patent: Oct. 29, 2019

(54) INJECTION MOULD FOR MANUFACTURING A ROTARY PART MADE OF A COMPOSITE MATERIAL HAVING EXTERNAL FLANGES, IN PARTICULAR OF A GAS TURBINE CASING

(71) Applicant: SAFRAN, Paris (FR)

(72) Inventor: Thierry Chauvin, Ermenonville (FR)

(73) Assignee: SAFRAN, Paris (FR)

( * ) Notice: Subject to any disclaimer, the term of this patent is extended or adjusted under 35 U.S.C. 154(b) by 832 days.

(21) Appl. No.: 14/770,888

(22) PCT Filed: Feb. 26, 2014

(86) PCT No.: PCT/FR2014/050416
§ 371 (c)(1),
(2) Date: Aug. 27, 2015

(87) PCT Pub. No.: WO2014/131992
PCT Pub. Date: Sep. 4, 2014

(65) Prior Publication Data
US 2016/0009003 A1  Jan. 14, 2016

(30) Foreign Application Priority Data
Mar. 1, 2013 (FR) .................................. 13 51862

(51) Int. Cl.
*B29C 33/00* (2006.01)
*B29C 70/46* (2006.01)
(Continued)

(52) U.S. Cl.
CPC ........ *B29C 33/0038* (2013.01); *B29C 70/462* (2013.01); *B29C 70/48* (2013.01);
(Continued)

(58) Field of Classification Search
CPC .... B29C 33/0038; B29C 70/462; B29C 70/48
See application file for complete search history.

(56) References Cited

U.S. PATENT DOCUMENTS

2013/0087955 A1* 4/2013 Plante ..................... B29C 33/38
264/571

FOREIGN PATENT DOCUMENTS

EP      1 961 923 A2   8/2008
FR      2 958 875 A1   10/2011
(Continued)

OTHER PUBLICATIONS

English Translation of Search Report dated Jun. 17, 2014, in corresponding International PCT Application No. PCT/FR2014/050416, filed on Feb. 26, 2014 (2 pages).

*Primary Examiner* — Jacob T Minskey
*Assistant Examiner* — Melody Tsui
(74) *Attorney, Agent, or Firm* — Bookoff McAndrews, PLLC

(57) ABSTRACT

The invention relates to an injection mold (4) for manufacturing a rotary part made of a composite material having outer flanges, comprising a mandrel (2) on which a fiber reinforcement is intended to be held (9) and including a central wall (6) the profile of which matches that of the part to be manufactured and two side plates (8), molding wedges (12) for bearing against a non-covered surface of the fiber reinforcement, and two outer bells (14) for covering the molding wedges and the plates of the mandrel with sealing O-rings (24) being inserted between the bells and the plates of the mandrel, the bells each being provided with an attachment flange (20) for bearing against one another with at least one sealing O-ring (26) inserted therebetween, the attachment flanges of the bells being clamped against one another.

9 Claims, 2 Drawing Sheets

(51) Int. Cl.
    *B29C 70/48*     (2006.01)
    *F01D 5/28*     (2006.01)
    *F01D 25/24*     (2006.01)
    *B29L 31/00*     (2006.01)
    *B29K 105/08*     (2006.01)

(52) U.S. Cl.
    CPC ............ *F01D 5/282* (2013.01); *F01D 25/24* (2013.01); *B29K 2105/0809* (2013.01); *B29L 2031/7504* (2013.01); *F05D 2230/21* (2013.01); *Y02T 50/672* (2013.01)

(56) References Cited

FOREIGN PATENT DOCUMENTS

FR           2958875 A1 *  10/2011  ............ B29C 33/38
WO    WO 2011/161380 A1  12/2011

* cited by examiner

INJECTION MOULD FOR MANUFACTURING A ROTARY PART MADE OF A COMPOSITE MATERIAL HAVING EXTERNAL FLANGES, IN PARTICULAR OF A GAS TURBINE CASING

This application is the U.S. national phase entry under 35 U.S.C. § 371 of International PCT Application No. PCT/FR2014/050416, filed on Feb. 26, 2014, which claims priority to French Patent Application No. FR 1351862, filed on Mar. 1, 2013, the entireties of each of which are incorporated by reference herein.

BACKGROUND OF THE INVENTION

The present invention relates to the general field of the manufacturing using composite materials of rotary parts having outer flanges, particularly gas turbine casings, and more particularly retention casings for gas turbine fans for aeronautical engines.

In an aeronautical gas turbine engine, a fan casing fulfils several functions. It defines the air intake duct in the engine, bears an abradable material facing the apex of the fan blades, bears a possible structure for absorbing sound waves for acoustic processing at the motor intake and incorporates or bears a retention shield. The latter forms a trap retaining debris, such as ingested objects or fragments of damaged blades, projected by centrifugation, in order to avoid them passing through the casing and reaching other parts of the aircraft.

The production of a fan retention casing made of a composite material has already been proposed. The reader is for example referred to document EP 1,961,923 which describes the fabrication of a casing out of composite material with varying thickness, consisting of the formation of a fiber reinforcement by superimposed layers of a fiber texture and the densification of the fiber reinforcement by a matrix. According to this invention, the fiber texture is achieved by three-dimensional weaving of varying thickness and is wound in several superimposed layers on a mandrel having a central wall of profile corresponding to that of the casing to be manufactured, and two side plates with profile matching that of the outer flanges of the casing. The winding on a mandrel of a woven texture of varying thickness as described in this document makes it possible to directly provide a tubular preform having the desired profile with variable thickness.

Different closing wedges are then applied to the fiber reinforcement wound on the mandrel. The closing wedges and the mandrel thus form an injection mold into which a resin is injected before being polymerized. The injection of the resin into the injection mold can thus be carried out by an injection process of LCM (Liquid Composite Molding) type, and particularly of RTM (Resin Transfer Molding) type.

In practice, the production of the injection molds for manufacturing a composite material gas turbine casing raises the problem of guaranteeing perfect sealing of the mold. However, injection molds of the prior art have the drawback of increasing the number of sealing points. In particular, it is generally necessary to treat sealing element per element, each element of the mold having on its periphery a seal in contact with the adjoining elements of the mold. In addition, for some of these elements of the injection mold, sealing must be achieved on non-planar surfaces, which further complicates the sealing of the mold.

SUBJECT AND SUMMARY OF THE INVENTION

There is therefore a need for an injection mold for manufacturing a rotary part made of a composite material having outer flanges, wherein the sealing is simplified by limiting the number of sealing points and using exclusively planar sealing surfaces.

In accordance with the invention, this aim is achieved using an injection mold comprising an axisymmetric mandrel on which a fiber reinforcement formed by superimposed layers of a fiber texture is intended to be supported, the mandrel including a central annular wall, the profile of which matches that of the part to be manufactured and two side plates, the profiles of which match those of the outer flanges of the part to be manufactured, molding wedges for bearing against a non-covered surface of the fiber reinforcement, and two axisymmetric outer bells for covering the molding wedges and the plates of the mandrel, with sealing O-rings being inserted between the bells and the plates of the mandrel, the bells each being provided with an attachment flange for bearing against one another with at least one sealing O-ring inserted therebetween, the attachment flanges of the bells being clamped against one another in a direction substantially parallel to an axis of symmetry of the mandrel.

The sealing of the injection mold is produced with a limited number of sealing points, particularly between the bells and the mandrel plates and between the two bells. Furthermore, this sealing can be obtained between planar surfaces by way of simple sealing O-rings. The fitting of the seal of the injection mold is greatly simplified thereby.

According to an advantageous provision, two sealing O-rings are inserted between each bell and the corresponding plate of the mandrel and two sealing O-rings are inserted between the respective attachment flanges of the bells.

The lining of the seals at the various sealing points makes it possible to rapidly identify the site of a leak. Specifically, with such a provision, in the event of a leak (i.e. in the event of a loss of sealing after the vacuum creation step), for each sealing point of the mold, the volume delimited by the two seals is placed in a vacuum, which makes it possible to identify which sealing point of the mold is defective. Such an operation does not require the undoing of all the sealing points to identify which of them is defective.

The mandrel can be made of two separate parts bearing against one another with at least one sealing O-ring inserted therebetween, each part including one of the plates of the mandrel. In this case, two sealing O-rings are advantageously inserted between the two separate parts of the mandrel. Thus, before even starting the spooling of the fiber reinforcement on the mandrel of the mold, it is possible to control the quality of the sealing between the two parts forming it.

Each bell may further comprise a radial part for axially bearing against a plate of the mandrel, and an axial part for radially bearing against one or more molding wedges.

The molding wedges may comprise corner wedges for bearing against the part of the fiber reinforcement covering the angles formed between the central wall and the plates of the mandrel and at least one central wedge for bearing against the part of the fiber reinforcement covering the central wall of the mandrel. In this case, the corner wedges and the central wedge are preferably formed from several angular segments of wedges placed end to end.

Another subject of the invention is an injection molding method for manufacturing a rotary part made of a composite material having outer flanges, comprising the winding of a fiber texture in superimposed layers on the mandrel of an injection mold as previously defined, the fitting of the molding wedges of the injection mold against a non-covered surface of the fiber reinforcement thus formed, the covering of the molding wedges and the plates of the mandrel by the bells of the injection mold with sealing O-rings inserted between the bells and the plates of the mandrel, the injection of a resin into the injection mold, and the polymerization of the resin.

Yet another subject of the invention is the application of a method as defined above to the injection molding of a rotary part for manufacturing a gas turbine casing made of a composite material.

BRIEF DESCRIPTION OF THE DRAWINGS

Other features and advantages of the present invention will become apparent from the description given below, with reference to the appended drawings which illustrate an exemplary embodiment thereof that is in no way limiting in nature. In the figures.

DETAILED DESCRIPTION OF THE INVENTION

The invention will be described hereinbelow in the context of its application to the manufacturing of a casing for a fan of an aeronautic gas turbine engine. More generally, the invention applies to the manufacturing of any rotary part having at its axial end flanges protruding outward.

An example of a manufacturing process for such a fan casing is described in document EP 1,961,923 to which the reader may refer.

The casing is made of a composite material with fiber reinforcement densified by a matrix. The reinforcement is made of fiber, for example carbon, glass, aramid or ceramic, and the matrix is made of a polymer, for example epoxide, bismaleimide or polyimide.

In brief, the manufacturing process described in this document consists in producing a fiber texture by three-dimensional weaving with warp feeding on a drum (hereinafter known as the feeding mandrel) having profile determined according to the profile of the casing to be manufactured.

Figure 1:
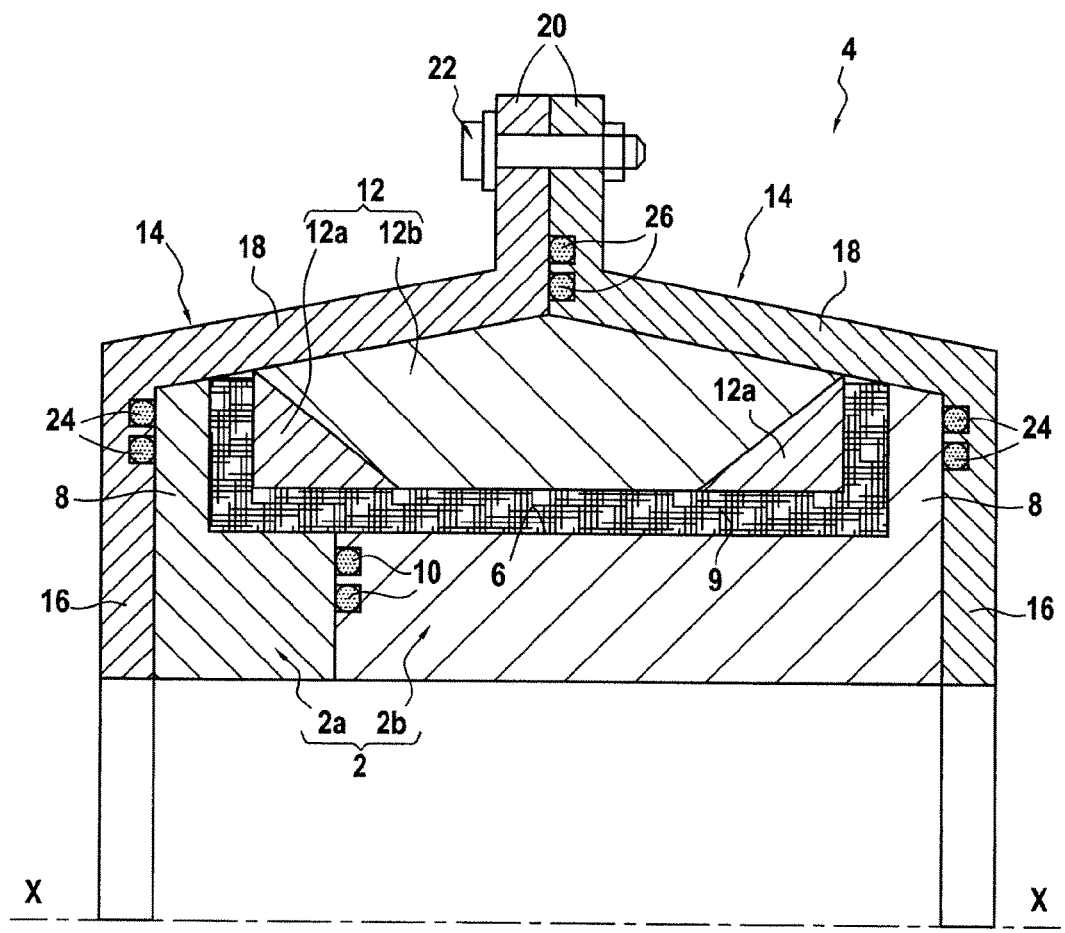
FIG. 1 is a half-view of a longitudinal section of an injection mold according to the invention.
Figure 2:
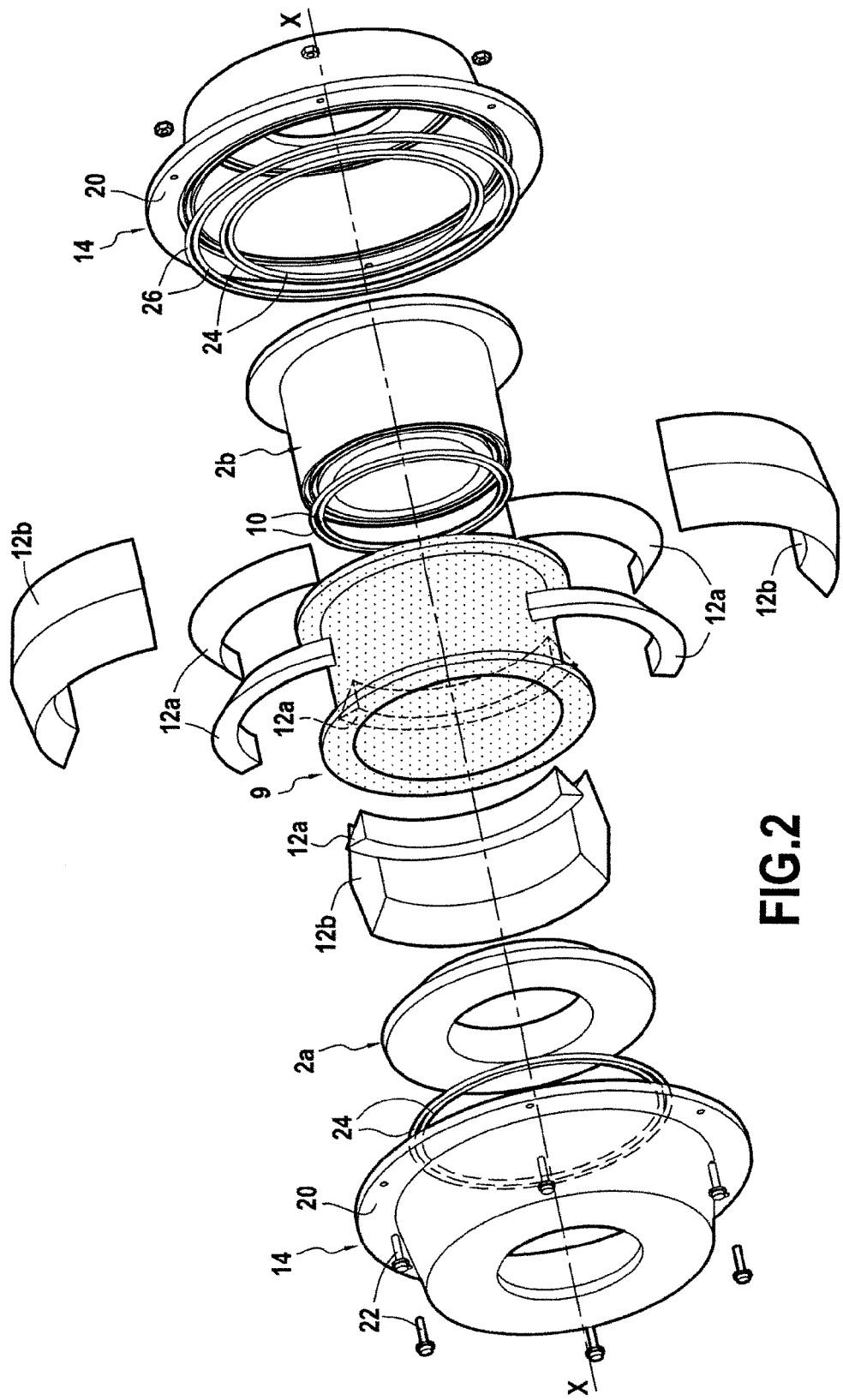
FIG. 2 is a perspective and exploded view of the injection mold in FIG. 1.

The fiber texture thus produced is then transferred to the mandrel 2 of an injection mold 4 in accordance with the invention and as represented in FIGS. 1 and 2.

In practice, the fiber texture is wound in several superimposed layers on the mandrel of the injection mold. When the fiber texture has finished being wound on the mandrel, the injection mold is closed by a counter-mold. A vacuum is then created inside the mold and a resin is injected into it by an injection process of RTM type. Once the resin has become polymerized, the injection mold is opened and the fiber reinforcement densified by the matrix is demolded.

As represented in FIGS. 1 and 2, the mandrel 2 of the injection mold 4 according to the invention is a part with an axis of symmetry X-X having a central annular wall 6, the profile of which matches that of the casing to be manufactured, and two side plates 8, the profiles of which match those of the outer flanges of the casing to be manufactured.

The mandrel 2 of the injection mold is produced in two separate parts 2a, 2b which are fixed bearing axially against one another, each part including a portion of the central wall 6 and one of the plates 8 of the mandrel. The production of the mandrel in two parts makes it possible to turn out the fiber reinforcement 9 after polymerization of the resin.

At least one sealing O-ring 10 is inserted between the two parts 2a, 2b of the mandrel to achieve sealing between these two elements of the injection mold. This O-ring is centered on the axis of symmetry X-X of the mandrel.

Once the fiber texture has been wound in several superimposed layers on the mandrel 2, the injection mold 4 is closed by way of a counter-mold.

More precisely, molding wedges 12 are first positioned on the non-covered surface of the fiber reinforcement. These molding wedges consist in corner wedges 12a for bearing against the part of the fiber reinforcement covering the angles formed between the central wall 6 and the plates 8 of the mandrel and a central wedge 12b for bearing against the part of the fiber reinforcement covering the central wall of the mandrel.

The corner wedges 12a and the central wedge 12b are sectored, that is to say that they are each formed of several angular segments of wedges that are placed end to end to cover the fiber texture over its whole circumference. For example, as represented in FIG. 2, these segments can be 3 in number per wedge but can be more numerous (in particular 6 segments per wedge).

Once the fiber reinforcement 9 is wound on the mandrel 2 and the molding wedges 12 are arranged on the non-covered surface of it, the following step of closing the injection mold consists in applying two outer bells 14 to the assembly thus formed.

The outer bells 14 are axisymmetric parts centered on the axis of symmetry X-X of the mandrel. They cover the molding wedges 12 and the plates 8 of the mandrel.

In particular, each outer bell 14 comprises a radial part 16 which bears axially against one of the plates 8 of the mandrel and which extends as an axial part 18 bearing radially against one or more molding wedges 12.

This axial part 18 ends in an attachment flange 20 which bears axially against the attachment flange of the other outer bell, these two attachment flanges being clamped against one another in a direction substantially parallel to the axis of symmetry X-X of the mandrel by way of clamping means, such as systems of screw/nut 22 type as represented in the figures, or systems with hydraulic jacks.

Note that the outer bells 14 of the injection mold can be identical in shape and dimensions.

Moreover, the outer bells are assembled on the mandrel 2 with sealing O-rings inserted therebetween. In particular, at least one sealing O-ring is positioned between each radial part 16 of the bells and the plate 8 of the corresponding mandrel. Similarly, at least one sealing O-ring 26 is inserted between the respective attachment flanges 20 of the bells 14.

Note that these seals 24, 26 are centered on the axis of symmetry X-X of the mandrel and that they are housed in annular grooves formed in the outer bells 14. Of course, these seals could also be housed in grooves made in the mandrel of the injection mold.

Thus, the injection mold 4 according to the invention only includes four sealing points, namely the sealing point between the two parts 2a, 2b of the mandrel 2, the two sealing points between the two bells 14 and the two plates 8 of the mandrel, and the sealing point between the two attachment flanges 20 of the bells. Furthermore, the sealing at these points is easy to produce since it is achieved between annular surfaces that are planar.

Note also that with such an injection mold no sealing is required between the different molding wedges 12.

Preferably, the various seals of the injection mold are lined, i.e. the seals 10, 24 and 26 are two in number. For sealing O-rings having a diameter of around 2 m, the distance between the two seals of one and the same sealing point is typically between 15 and 50 mm approximately.

The lining of the seals at the various sealing points thus makes it possible to rapidly identify the site of a leak. In practice, in the event of a leak appearing during the step of placing the injection mold in a vacuum, for each sealing point of the mold the volume delimited by the two seals is placed in a vacuum. This operation makes it possible to identify which sealing point of the mold is defective and which seal must be replaced. Such an operation does not necessarily require the undoing of all the sealing points to identify the defective one.

In addition, before even starting to wind the layers of fiber texture on the mandrel of the mold, it is possible to control the quality of the sealing between the two parts 2a, 2b that form the mandrel, using such an operation of placing the volume delimited between the two seals 10 under a vacuum.

Lastly, placing the volumes delimited between each pair of seals under a vacuum makes it possible to exert a non-negligible compaction force on the fiber reinforcement. It has indeed been calculated that the flanging force obtained by the creation of such a vacuum (in the order of 0.9 bars) can result in a compaction force generated on the molding wedges in the order of 10000 Newtons.

The invention claimed is:

1. An injection mold for manufacturing a rotary part made of a composite material having outer flanges, comprising:
    an axisymmetric mandrel on which a fiber reinforcement formed by superimposed layers of a fiber texture is configured to be supported, the mandrel including a central annular wall, the profile of which matches that of the part to be manufactured, and two side plates, the profiles of which match those of the outer flanges of the part to be manufactured;
    molding wedges for bearing against a non-covered surface of the fiber reinforcement; and
    two axisymmetric outer bells for covering the molding wedges and the plates of the mandrel with sealing O-rings being inserted between the bells and the plates of the mandrel, the bells each being provided with an attachment flange for bearing against one another with at least one sealing O-ring inserted therebetween, the attachment flanges of the bells being clamped against one another in a direction substantially parallel to an axis of symmetry of the mandrel, wherein each bell is integrally formed with its respective attachment flange.

2. The injection mold according to claim 1, wherein two sealing O-rings are inserted between each bell, and the corresponding plate of the mandrel and two sealing O-rings are inserted between the respective attachment flanges of the bells.

3. The injection mold according to claim 1, wherein the mandrel is made of two separate parts bearing against one another with at least one sealing O-ring, therebetween, each part including one of the plates of the mandrel.

4. The injection mold according to claim 3, wherein two sealing O-rings are inserted between the two separate parts of the mandrel.

5. The injection mold according to claim 1, wherein each bell further comprises a radial part for axially bearing against a plate of the mandrel, and an axial part for radially bearing against one or more molding wedges.

6. The injection mold according to claim 1, wherein the molding wedges comprise corner wedges for bearing against the part of the fiber reinforcement covering the angles formed between the central wall and the plates of the mandrel, and at least one central wedge for bearing against the part of the fiber reinforcement covering the central wall of the mandrel.

7. The injection mold according to claim 6, wherein the corner wedges and the central wedge are formed from several angular segments of wedges placed end to end.

8. An injection molding method for manufacturing a rotary part made of a composite material having outer flanges, comprising:
    winding a fiber texture in superimposed layers on the mandrel of an injection mold according to claim 1;
    fitting the molding wedges of the injection mold against a non-covered surface of the fiber reinforcement thus formed;
    covering the molding wedges and the plates of the mandrel by the bells of the injection mold with sealing O-rings inserted between the bells and the plates of the mandrel;
    injection of a resin into the injection mold; and
    polymerization of the resin.

9. An application of the method according to claim 8 to the injection molding of a rotary part for manufacturing a gas turbine casing made of a composite material.

* * * * *